Aug. 7, 1923.  1,464,037

H. A. HANSON

GEAR SHIFT

Filed Oct. 1, 1921   5 Sheets-Sheet 3

INVENTOR
HANS A. HANSON
BY HIS ATTORNEY
James T. Williamson

Aug. 7, 1923.

H. A. HANSON

GEAR SHIFT

Filed Oct. 1, 1921

INVENTOR.
HANS A. HANSON.
BY HIS ATTORNEY.
James F. Williamson

Patented Aug. 7, 1923.

1,464,037

UNITED STATES PATENT OFFICE.

HANS A. HANSON, OF EAU CLAIRE, WISCONSIN, ASSIGNOR TO FRANK LOTT, OF EAU CLAIRE, WISCONSIN.

GEAR SHIFT.

Application filed October 1, 1921. Serial No. 504,724.

*To all whom it may concern:*

Be it known that I, HANS A. HANSON, a citizen of the United States, residing at Eau Claire, in the county of Eau Claire and State of Wisconsin, have invented certain new and useful Improvements in Gear Shifts; and I do hereby declare the following to be a full, clear, and exact description of the invention, such as will enable others skilled in the art to which it appertains to make and use the same.

This invention relates to an automobile gear shift and particularly to such a shift adapted to be contained in a casing arranged to contain oil so that the parts are thoroughly lubricated at all times. The type of shift also has one connection to the transmission gears and is adapted to be operated by the connection to the clutch pedal and the various positions of the shift are arranged to be changed or determined from a point convenient to the driver.

It is an object of this invention to provide a gear shift in which any change of the gears can be made without stopping at a neutral position.

It is a further object of the invention to control the change of the gears and set the shift so that the gears will be shifted, as desired, by an indicator which is located in convenient position for manipulation by the driver. The invention also has as its object to arrange the shifting mechanism so that after the indicator is set the gears will be shifted upon operation of the clutch pedal.

It is still another object of the invention to provide a shift working with a right line motion, the moving parts being guided by parallel guide rods disposed in the gear shift casing.

Another object of the invention is to provide a gear shift disposed in the casing, the casing being arranged so that the shift can be connected to the clutch pedal at one side or the other thereof and the casing being also arranged so that certain parts of the gear shift can be removed through apertures in the sides thereof which are normally closed by screw plugs.

These and other objects of the invention will be fully set forth in the following description made in connection with the accompanying drawings in which like reference characters refer to the same parts throughout the different views, and in which.

Figures 1, 11, 14:
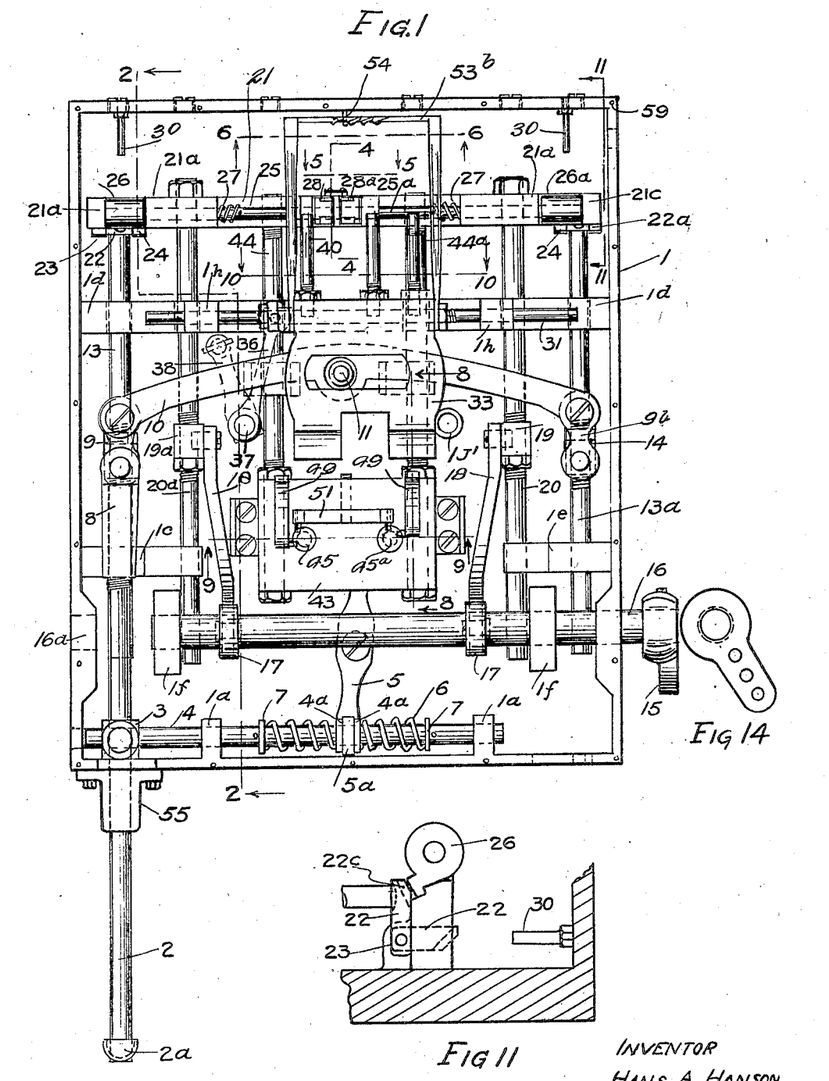
Fig. 1 is a plan view of the gear shifting mechanism with the top of the casing removed.
Fig. 11 is an enlarged section taken on the line 11—11 of Fig. 1, as indicated by the arrows.
Fig. 14 is a view in side elevation of the operating crank arm.

Referring to the drawings, particularly to Fig. 1, the gear shift is shown as enclosed in a rectangular oil proof casing 1, adapted to be attached to the automobile frame by lugs $a^1$. The connection to the transmission gearing is made by means of a connecting rod 2 having a head $2^a$ thereon adapted to move laterally to two positions to connect with two movable members in the gear transmission and to reciprocate longitudinally to move said members to the desired positions. The gear transmission forms no part of the present invention and is not illustrated but can be of any suitable type used in automobiles and providing for the reverse gear position, a neutral position, and low, intermediate and high speed positions. The rod 2 extends through a cylindrical head 3 upstanding from a rectangular block $3^a$ located just inside of the front wall of the casing 1. The block $3^a$ is rigidly secured to a sliding rod 4 sliding in spaced lugs $1^a$ projecting from the front of the casing 1 and a rod 4 is adapted to be reciprocated to move the rod 2 and the head $2^a$ to its two lateral positions. This movement is transmitted through a lever 5 which is connected to the rod 4 by an upstanding apertured portion $5^a$ integral therewith, through which the rod 4 is passed. Collars $4^a$ are slidable on the rod 4 at each side of the member $5^a$ and springs 6 are retained between these collars and other collars 7 secured in any suitable manner to the rod 4. The springs 6 and collars $4^a$ and 7 thus form a yielding connection between the lever 5 and the rod 4 to absorb the shock occasioned by the movements of the members 2 and 4. The lever 5 is oscillated to move the rod 4 at desired times in a manner to be later described.

Figure 2:
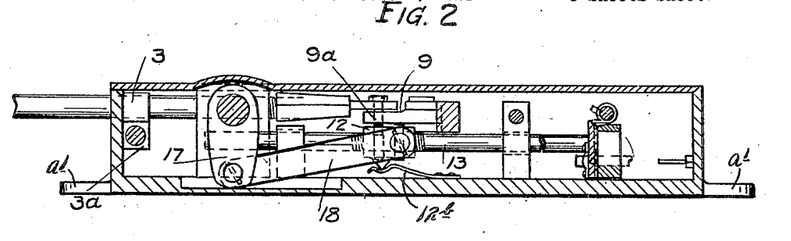
Fig. 2 is a section taken on the line 2—2 of Fig. 1.

The inner end of the rod 2 has threaded thereon a head 8 which is flattened at its inner end and pivoted to one end of a link 9, the other end of which is received in the bifurcated end of a lever 10 which is centrally pivoted to a shouldered stud 11 which upstands from and is screwed into a lug $1^b$ integral with the bottom of the casing 1. The pivotal member $9^a$ in the members 8 and 9 extends downwardly into a block 12 which is threaded onto a rod 13 and held in position by a suitable lock nut thereon. The rod 13 slides and is guided in a lug $1^c$ upstanding from and integral with the bottom of the casing 1 and also passes through an aperture formed in a transverse rib $1^d$ which also upstands from and is integral with the bottom of the casing 1. The opposite end of lever 10 is also bifurcated and pivoted to a link $9^b$ which is, in turn, pivoted to a block 14 which is adjustably threaded onto a rod $13^a$ similar to the rod 13, and, like the rod 13, guided in a lug $1^e$ and the rib $1^d$. The rods 13 and $13^a$ form the guiding means for the reciprocating movement of the member 2 and said member is actuated in one direction or the other by members to be later described contacting with the rear ends of the rods 13 and $13^a$. The block 12 is formed with a depending point adapted to seat in a depression in a yielding stop member $12^b$ secured to the bottom of casing 1 (see Fig. 2). This stop member becomes operative when the shift is in neutral position and frictionally holds block 12 in such position.

The gear shift is adapted to be connected to the clutch pedal of the automobile by a suitable link which connects with a lever arm 15 rigidly secured to a shaft 16 journaled in the side of the casing 1 and in spaced lugs $1^f$ upstanding from and integral with the bottom of casing 1. The lever 15 is provided with three holes so that an adjustable connection can be made to the clutch pedal.

Secured to the shaft 16 are spaced crank arms 17 (see Figs. 1 and 2) which project downwardly therefrom and have their ends bifurcated to embrace and be secured to links 18 which project rearwardly in the casing and are pivoted to journals projecting laterally from blocks 19 and $19^a$ which are adjustably threaded onto guide rods 20 and $20^a$, the blocks 19 and $19^a$ being held in position by suitable check nuts. The rods 20 and $20^a$ are guided in apertures formed in the lugs $1^c$ and $1^c$ and also pass through apertures in the rib $1^d$ and these rods at their rear end are fitted into a sliding member 21 to which they are secured by lock nuts threaded on the ends thereof, the said rods being shouldered to pass through the member 21. In this structure it will be seen that a turning movement of the lever 15 will reciprocate the member 21 longitudinally of the casing 1 and said member will be guided in right line movement by the rods 20 and $20^a$.

Figures 3, 5:
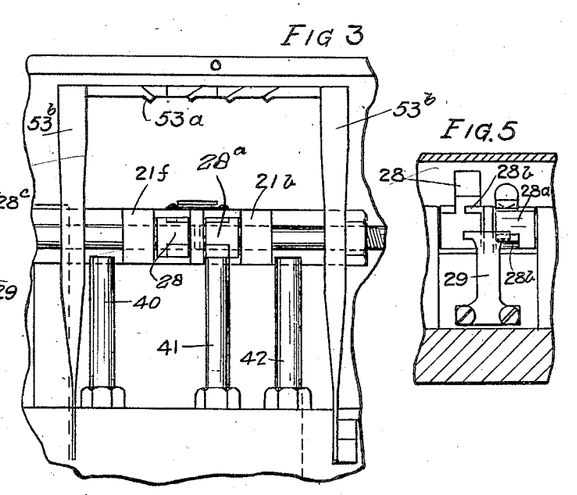
Fig. 3 is a plan view of a portion of the mechanism on an enlarged scale.
Fig. 5 is an enlarged view in rear elevation, as indicated by the arrows in line 5—5 of Fig. 1.
Figure 4:
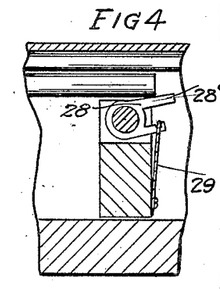
Fig. 4 is a section taken on the line 4—4 of Fig. 1, being on an enlarged scale.

The reciprocating movements of member 21 are adapted to move the rods 13 and $13^a$ and thus the member 2 and for this purpose the member 21 has openings therein near its ends in which are pivoted dogs 22 and $22^a$ by transverse pivots extending through lugs 23 formed integral with the member 21 and through removable lugs 24 attached to the member 21 by suitable fastening means. The member 21 has upstanding portions $21^a$ in which are journaled shafts 25 and $25^a$. These shafts are inclined slightly downwardly toward the center of the casing 1 and are journaled at their inner ends in upstanding lugs $21^b$ integral with the member 21. At the outer ends of the shafts 25 and $25^a$ are secured pawl members 26 and $26^a$ and these pawl members have a projecting tongue thereon shown clearly in Figs. 1 and 2 engaging an inclined surface on the lugs $21^a$ and lugs $21^c$ at the outer side thereof and these pawls are urged into engagement with said surfaces by coiled springs 27 disposed about the shafts 25 and $25^a$ and secured to the said shafts at one end and to the lugs $21^a$ at their other ends. To the inner ends of the shafts 25 and $25^a$ are secured trip members 28 and $28^a$, these members being rigidly secured to said ends. The members 28 and $28^a$ are provided with a forward upstanding arm $28^c$, as shown in Fig. 4 and with a rearward upstanding arm which is provided at one side with a notch 28$^b$, as shown in Fig. 5. A thin spring plate member 29 is secured to the rear of the member 21 and provided with a T-shaped upper end, the lateral projections of which are adapted, at certain times, to enter into the recesses 28$^b$. The dog 22 is provided centrally of its upper face with an inclined groove 22$^c$ which, when the dog 22 is in a position shown in dotted lines in Fig. 11 and the member 21 is reciprocated, is adapted to come in contact with a pin 30 screwed into and projecting from the rear end of the casing 1 and will thus be moved into vertical position.

Figure 13:
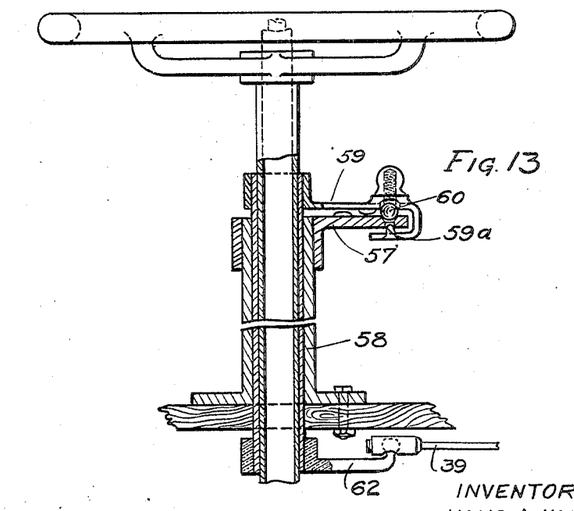
Fig. 13 is a vertical section through a portion of said mechanism.

In order to set the member 2 in the correct lateral position and to move the same in the proper direction longitudinally, the casing 1 is provided with a transversely movable member mounted on a rod 31 which is guided for movements laterally of the casing 1 in lugs 1$^h$ upstanding from the rib member 1$^d$. The transversely movable member comprises a block 32 adjustably held on the rod 31 by suitable lock nuts threaded thereon. A plate member 33 extends across the top of said block and having its sides bent down and clamped to the sides thereof, which plate member will be later described. In one side of the block 32 the rod 31 is provided with a member 34 clamped between a collar 35 and one of the lock nuts for holding the block 32 in position. The member 34 has a pin projecting at its bottom portion and the said pin enters one apertured end of a crank member 36, the other end of which is rigidly secured to a post 37 extending downwardly through a lug 1$^j$ upstanding from the bottom of casing 1 and extending through the bottom of the casing and having secured thereto, the crank arm 38 located outside of the casing beneath the bottom thereof. The free end of the crank arm 38 is adapted to be connected to a connecting member 39 shown in Fig. 13 and which is, in turn, connected to the controlling and indicating mechanism located in convenient position for manipulation by the driver of the automobile. It will thus be seen that by swinging the crank arm 38, the rod 31 and block 32 will be moved transversely across the casing 1. The block 32 has screwed in its rear face and held by suitable lock nuts, rods 40, 41 and 42 which project rearwardly and are adapted to contact at certain times with one or the other of the tripping members 28 and 28$^a$.

Figure 7:
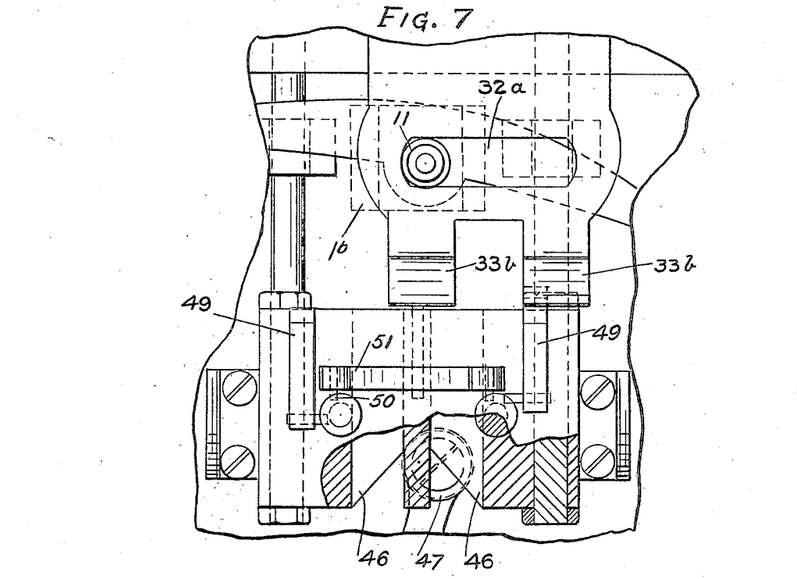
Fig. 7 is a plan view of a portion of the shift, as shown in Fig. 1, partly in section also on an enlarged scale.

The rod 2 is moved laterally, as stated, by the lever 5 and said lever is controlled by an adjustable cam means. This cam means is contained in a block 43 which is rigidly secured to the member 21 by rods 44 and 44$^a$ which, at their rear ends, are screwed into the member 21. At their forward ends, the rods 44 and 44$^a$ extend through the block 43 and are held in place thereon by suitable lock nuts. The block 43 is provided with spaced cylindrical apertures and members 45 and 45$^a$ are mounted therein for vertical reciprocation. Each of the members 45 and 45$^a$, has secured thereto a cam member 46 having a lateral lug projecting therefrom into the said member and secured therein by a pin extending through the member. These cams are formed at their front end, as shown in Fig. 7, with inclined surfaces and are adapted to be raised and lowered into the position shown in Fig. 9, being set when in the upper position in a recess formed in the top of the block 43. When in a lowered position, the cam members 46 are in position to act on a cam roller 47 mounted in the ordinary manner on the inner end of the lever 5 by a suitable shouldered stud. The lever 5 will thus be thrown to one side or the other when the block 43 is reciprocated thereagainst depending upon which cam 46 is in lowered position. The members 45 and 45$^a$ are formed at their upper surfaces with circumferential grooves (see Figs. 8 and 9) in which pins 48 are disposed, which pins project from the inner side of pivoted bell crank levers 49 which are pivoted at their angle portion to the block 43, being received in suitable grooves formed in the top surface of said block. The grooves in the top of the members 45 also receive pins 50 which project forwardly from the bossed ends of a bell crank lever 51 which is centrally pivoted to the block 43 by a suitable pivot pin therein and is, likewise, received in a groove extending transversely in the top surface of said block. By means of the bell crank lever 51, when one of the members 45 is depressed, the other is necessarily raised and vice versa.

Figure 6:
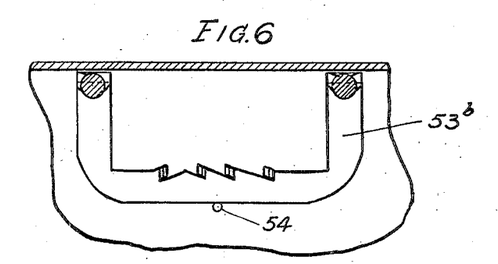
Fig. 6 is a section taken on the line 6—6 of Fig. 1, as indicated by the arrows being shown on an enlarged scale.
Figure 8:
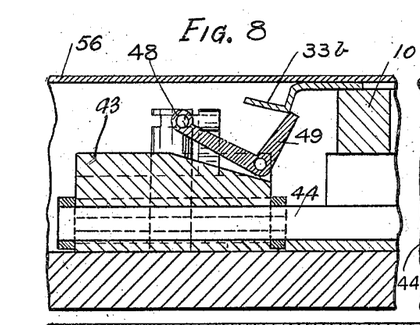
Fig. 8 is a section taken on the line 8—8 of Fig. 1, as indicated by the arrows.
Figure 9:
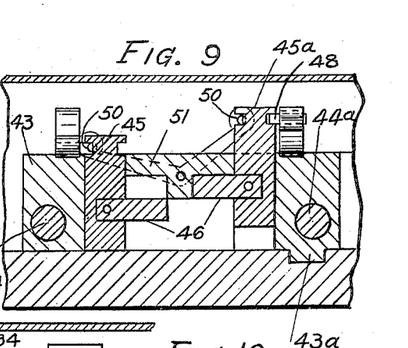
Fig. 9 is a section taken on the line 9—9 of Fig. 1.
Figure 10:
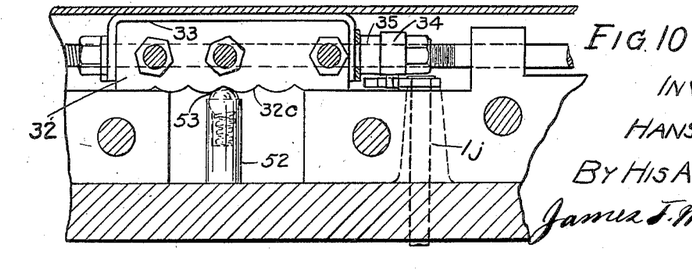
Fig. 10 is a vertical section taken on the line 10—10 of Fig. 1, as indicated by the arrows.

The plate 33 referred to (see Figs. 1, 7 and 8) extends forwardly across the block 32 and across the lever 10 and is formed with a transverse slot 32$^a$ to permit transverse movement thereof about the stud 11. This plate 33 is formed with two projecting tongues 33$^b$ at its forward end, which tongues are bent, as shown in Fig. 8, to contact with the rearwardly and upwardly projecting arms of the bell crank lever 49 when the block 32 is reciprocated. These tongues 33$^b$ are adapted to be brought into alinement with either one of the bell crank levers 49 when the block 32 is reciprocated so that one or the other of the members 45 or 45$^a$ are depressed. The block 43 is provided with a rectangular projection 43$^a$ adapted to move in a groove in the bottom surface of the casing 1 so as to be guided rigidly in a right line movement. The block 32 is provided on its undersurface with a series of depressions 32$^c$ and a post 52 is secured to the bottom of the casing 1 and contains an upwardly spring pressed bail 53 which is adapted to be seated in said depressions successively as the block 32 is moved step by step laterally of the casing. A bail member 53 has its rear ends flattened and secured to the sides of the block 32 adjacent the downturned portions of the members 33 and this bail member projects rearwardly and the connected sides thereof are then bent downwardly forming a U-shaped member disposed substantially in a vertical plane, as clearly shown in Fig. 6. The lower connecting portion of the member 53 is flattened and formed with projections 53$^a$. The bottom portion of the member 53 is also supported or maintained at a desired level by a pin 54 projecting inwardly from the rear side of the casing 1.

It may be here noted that the casing 1 and the gear shift mechanism is adapted to be connected from either side, and for this purpose the casing is formed with an aperture 16$^a$ arranged to accommodate the shaft 16 which projects from the other side of the casing. The lug 1$^j$ is also duplicated symmetrically of the casing by the lug 1$^{j\prime}$ so that the shifting lever or crank arms 38 can be connected at either side. The casing 1 is also provided with apertures in the walls thereof in line with the rods 13 and 13$^a$, 20 and 20$^a$, 44 and 44$^a$ and with the rod 31, so that these rods can be removed longitudinally from the casing. These apertures are normally closed by screw plugs shown in Fig. 1. The rod 2 is provided with a suitable packing member 55 of leather or other flexible material constructed to prevent the escape of oil thereabout. The casing is provided with a metal top 56 which is secured thereto by spaced bolts taking into the tapped holes 59 shown in Fig. 1.

Figure 12:
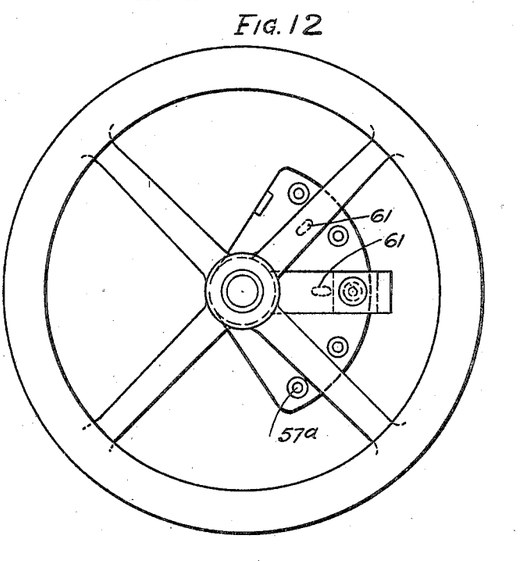
Fig. 12 is a plan view of the quadrant adjacent the steering wheel for changing the position of the gear shifts.
Figures 15, 16:
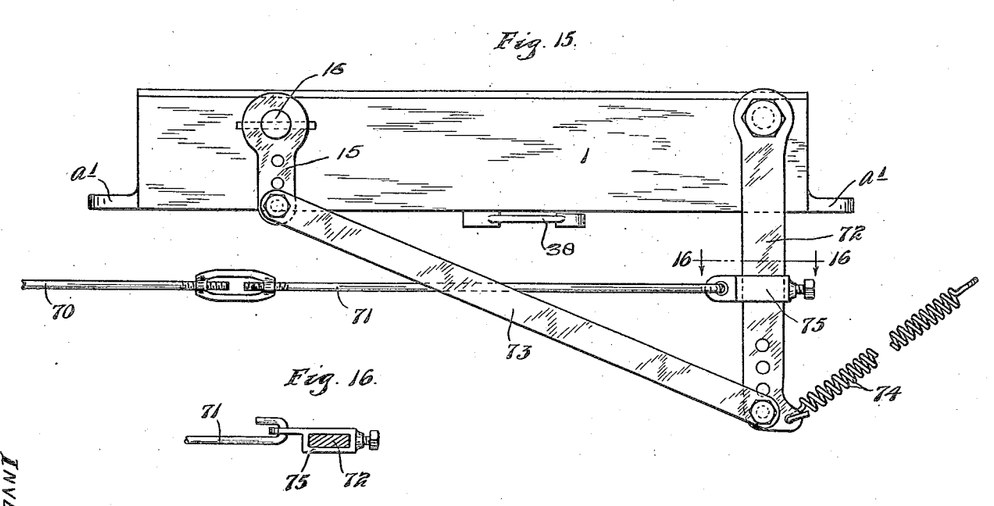
Fig. 15 is a side view of the shift and connections.
Fig. 16 is a detail section taken on line 16—16 of Fig. 15.

The member 32 and the attached members are designed to be moved laterally into the successive positions from a position adjacent the steering wheel. In Fig. 12 is shown a quadrant plate 57 secured to a post 58 surrounding the steering wheel post which is suitably attached to the automobile. A lever arm 59 pivoted to and swung about the steering wheel post extends over the quadrant plate 57 and beneath the same and is provided with an upstanding pin 59$^a$ normally adapted to enter one of a plurality of apertures 57$^a$ formed about the quadrant plate 57. The pin 59$^a$ is normally urged upward into said holes by a spring pressed ball 60 which is partially received in a recess in the lever 59 and is pressed upon by a spring disposed in a central bore in the handle portion of said lever. When it is desired to swing the lever 59, the same is merely pushed downward by the handle portion and swung laterally. Lugs 61 are formed on the members 57 and 59 adapted to pass each other with some little friction and to form a friction stop to indicate to the driver when he is moving the lever 59 to the last aperture 57$^a$ or to the position for reversing the gears. It will be evident that by turning the lever 59, the crank arm 62 will be moved which will, in turn, move the connecting member 39 connected thereto by a universal joint, which, as stated, is adapted to be connected to the crank arm 38 which shifts the block 32. The connections to the shift are shown in Figs. 14 and 15. The rods 70 and 71 are adjustable by a turn buckle and adapted to be connected to the clutch pedal. Rod 71 is slidably connected to arm 72, by head 75 held in adjusted position by a set screw. Arms 15 and 72 have a plurality of holes for adjustably connecting link 73. The various adjustments accommodate the device for long and short stroke clutches. A spring 74 attached to arm 72 and a suitable point on the frame returns the parts to normal position after each actuation.

The operation of the device is as follows: When the clutch is in, the lever 15 will be swung so that the member 21 is in its rearward position. Assuming that the block 32 is moved to the extreme position to the left in Fig. 1, which will be the reversing position, the narrow vertical part of the spring member 29 will then be to the left of the extreme tooth 53$^a$ on the member 53. The clutch can now be disengaged and the lever 15 swung and the member 2 will now be moved. In this position, the trip member 28 is in alinement with the rod 40. As the member 21 is moved forward, rod 40 will contact with the forward arm of the member 28 and turn the same downwardly, as shown in Fig. 4. This rotates the shaft 25 and rotates the pawl 26 so that the projecting lug thereon is moved upwardly, as indicated by a dotted line in Fig. 2. The dog 22 is now free to swing on its pivot and, as the member 21 moves forwardly, the rod 13 presses against said dog and merely moves it downwardly to the position shown in dotted lines in Fig. 11. The trip member 28 now being in alinement with the rod 40 when the member 21 is moved forwardly the dog member 22$^a$ contacts rod 13$^a$. As this dog member 22$^a$ is held by the pawl 26 it cannot swing downwardly and thus moves the rod 13$^a$ forwardly swinging the lever 10 and moving the rod 2 rearwardly. This movement will move the rod 2 and member 2$^a$ toward the casing which will be the position to put the gears in reverse. When the member 32 is in the position assumed, that is to the left, the tongue 33$^b$ is in position to contact with the bell crank lever 49 on the right so that the cam member 46 on the right will be depressed when the member 21 is moved forwardly. This will swing the inner end of lever 5 to the left and move the member 2 to the right, which will be the proper position for moving the gears in the reverse. The clutch can now be operated and the lever arm 15 swung, and unless the controlling or indicating lever 59 is again moved, the gears will not be changed. By moving the lever 59 to the next notch the block 32 will be moved to the right, as seen in Fig. 1 and the spring 29 will engage between the first two notches 53ª of member 53. As the spring passes the first notch it is pressed inwardly and the trip member 28 which has been held by the engagement of the upper projecting portion of the spring with the recess 28ᵇ will be released and both trip members 28 and 28ª will stand in vertical position. When the member 21 is now moved forwardly the trip members 28 and 28ᵇ will travel between the projecting rods 40 and 41 and both rods 13 and 13ª will be moved forward by the dogs 22 and 22ª so that the rod 2 will be reciprocated for only half its movement. This will bring the gears into neutral. The clutch can now be repeatedly worked and the gears will not be moved out of this position if the lever 59 is not again moved. By moving the lever 59 to the next notch, the spring 29 will move between the second and third projections 53ª from the right and the trip member 28ª will move into alinement with the projecting rod 41. The tongue 34ᵇ on the right will still remain in position to operate the bell crank lever 49 on the right so that the cam 46 on the right, as shown in Figs. 1 to 7, will remain depressed. When member 21 is now moved forwardly, rod 41 is swung to trip member 28ª downward and the same will be engaged and held by the spring 29. The trip members 28 and 28ª when pushed backwardly flex or push the spring 29 back a short distance until the lateral projections at the top of said spring snap into the slots in the sides of the trip members. This holds the trip members until the spring 29 is again pressed toward member 21 when the same are disengaged. This lifts the pawl member 26ª so that the dog 22ª will swing down idly and now operates the rod 13ª. The pawl 26, however, will hold the dog 22 in vertical position since the trip member 28 will not be moved and this dog will operate rod 13 and move the member 2 forwardly swinging lever 10 about its pivot. This will move the gears into the position of low.

The teeth or projections 53ª on the member 53 act as cam surfaces so that, when said member is moved laterally, these teeth press against the narrow portion of spring 29 and push the same inwardly, thus releasing the trip member 28 and 28ª which are immediately moved to vertical position by the springs 27 so that they are in position to be engaged by any of the rods 40 to 42 which may be brought into alinement therewith.

By swinging the lever 59 to the next two notches, the gears will be moved similarly into intermediate and high positions and the trip members 28 and 28ª will be operated as described, being moved into alinement with rods 41 and 42, respectively, and the tongue 33ᵇ on the left being moved into alinement with the bell crank lever 49 on the left, the latter movement depressing the cam 46 on the left and raising the cam 46 on the right. It will thus be seen that by merely swinging the lever 59 to the desired position and operating the clutch pedal, the gears will be shifted to the desired position. The arrangement is such that the clutch is entirely withdrawn before the shift is made.

From the above description it is seen that applicant has provided a simple and compact gear shifting mechanism which can be variously applied to practically any type of automobile and which is compactly housed in a casing adapted to contain oil. The various movements are accomplished by moving members in the casing in a right line, the moving members being guided by parallel rods. The mechanism is easily assembled and disassembled and can be made with comparatively small expense. The casing 1 is preferably made of aluminum and the other parts of steel.

While one embodiment of the invention has been described, it will, of course, be understood that various changes may be made in the form, details and arrangement of the device without departing from the scope of applicant's invention, which, generally stated, consists in the matter shown and described and set forth in the appended claims.

What is claimed is:

1. A gear shift device for an automobile having in combination, a member adapted to be oscillated laterally to a plurality of positions to connect with different gear shifting elements of the transmission gearing and to be reciprocated in any of such positions to move said elements, means for moving said member laterally, including selectively controlled oppositely facing cams, and means for moving said member longitudinally, both means being operated by the clutch pedal of the automobile.

2. The structure set forth in claim 1, and means located for convenient manipulation by the driver of the automobile to determine the lateral position to which said member is moved, said parts being constructed and arranged so that unless said last mentioned means is operated, the members will not be moved by the operation of the clutch pedal.

3. A gear shift device for an automobile having in combination a member adapted to be oscillated laterally to a plurality of positions to connect with different gear shift elements of the transmission gearing and to be reciprocated in any of such positions to move said elements, means connected to the clutch pedal of the automobile adapted to move said member laterally and to reciprocate the same, a casing in which the shift device is enclosed and parallel members guided for movement in a straight line in said casing to one of which said member is pivoted, said means also being guided for rectilinear movement parallel to said members.

4. The structure set forth in claim 3, and a lever centrally pivoted to said casing to which said parallel members are pivotally connected.

5. A gear shift mechanism for an automobile having in combination a member adapted to be moved laterally to a plurality of positions to connect with gear shifting elements and to be reciprocated to move said elements, a casing adapted to contain oil from which said member projects, and means in said casing guided on parallel rods spaced from the bottom and walls of said casing adapted to reciprocate said member.

6. The structure set forth in claim 5, and means movable laterally in said casing for controlling the direction of reciprocation of said member and the lateral position thereof.

7. The structure set forth in claim 5, said means including an adjustable cam for controlling the lateral movement of said member.

8. A gear shift mechanism for an automobile having in combination a member adapted to be moved to a plurality of lateral positions to connect with the gear shifting elements and to be reciprocated to move said elements, a casing from which said member projects, means in said casing guided on parallel rods adapted to reciprocate said member including an adjustable cam for controlling the lateral movement of said member, and means movable laterally in said casing for controlling the adjustment of said cam means.

9. The structure set forth in claim 5, said means including tripping elements, and means movable laterally transversely of said casing for operating said tripping elements to control the direction of reciprocation of said member.

10. A gear shifting mechanism for an automobile comprising a member adapted to be connected to the transmission gearing and oscillatable to a plurality of lateral positions, and reciprocable to a plurality of positions, a casing into which said member projects, means guided in a right line for movement longitudinally of said casing to which said member is pivoted, a centrally pivoted lever in said casing pivotally connected at its ends to said means, and a reciprocating member in said casing adapted to be reciprocated by movements of the clutch pedal of the automobile having dogs thereon adapted to contact with said means to swing said centrally pivoted lever and reciprocate said first mentioned member.

11. The structure set forth in claim 10, spring pressed shafts journaled in said reciprocating means having tripping members at one end, and pawl members at the other ends, said pawl members controlling said dogs.

12. The structure set forth in claim 11, and a laterally reciprocable member in said casing having rods projecting therefrom adapted to alternately actuate said tripping members.

13. The structure set forth in claim 12, said laterally reciprocating member being controlled by means located adjacent the steering wheel of the automobile.

14. The structure set forth in claim 12, and a stop member adapted to contact with said laterally reciprocating member, to hold the same in various respective positions.

15. A gear shift mechanism for an automobile comprising a laterally oscillatable and reciprocating member adapted to be connected to the transmission gearing, a casing into which said member projects and a reciprocating means in said casing for controlling the movements of said member operable from the clutch pedal of the automobile, said means including an adjustable cam having vertically reciprocable cam members adapted to be shifted to operative and inoperative positions alternately.

16. The structure set forth in claim 15, and a lever pivoted in said casing having means at one end adapted to contact with the cam which is in operative position to swing the same member into different lateral positions.

17. The structure set forth in claim 15, and laterally movable means for said casing adapted to be brought into various positions to operate said cam members when said reciprocating means is reciprocated.

18. A gear shift mechanism for an automobile having in combination, a member adapted to be connected to the transmission gearing, and oscillated to a plurality of positions and reciprocated to a plurality of positions to shift said gears, a rectangular casing adapted to contain oil into which said member projects, and reciprocating means in said casing for moving said member to its various positions, said means including parallel guide rods guided in lugs in said casing formed integral therewith.

19. The structure set forth in claim 18, the walls of said casing being provided with apertures in line with said guide rods through which said guide rods may be removed.

20. The structure set forth in claim 19, said apertures being closed by screw plugs and said casing being oil tight.

21. A gear shift mechanism for an automobile comprising a casing, a member guided therein for straight line movement and adapted to operate means for shifting the gears, said member including pivoted dogs at each side, shafts journaled in said member at each side thereof, pawls on the end of said shafts normally adapted to hold said dogs against movement, and tripping members on the other ends of said shafts adapted to be swung to move said pawls out of engagement with said dogs.

22. The structure set forth in claim 21, and a plate spring secured to said member and having portions adapted to engage with said trip members to hold the same in their swung positions when the same have been swung to move said pawl members.

23. The structure set forth in claim 22, and a laterally removable notched member in said casing adapted to act on said spring to move the same toward the reciprocating member to which it is attached to cause the spring to release said tripping members.

24. A gear shift mechanism for an automobile comprising a casing, a member projecting therefrom adapted to be connected to the gearing to shift the same and oscillatable to a plurality of positions, a lever pivoted in said casing and connected to said member for oscillating the same, and an adjustable cam means in said casing adapted to operate said lever to move said member.

In testimony whereof I affix my signature.

HANS A. HANSON.

Witnesses:
HAN MACLEOD,
H. R. GILBERTSON.